(12) United States Patent
Casado et al.

(10) Patent No.: US 8,862,467 B1
(45) Date of Patent: Oct. 14, 2014

(54) CONTEXTUAL SPEECH RECOGNITION

(71) Applicant: Google Inc., Mountain View, CA (US)

(72) Inventors: Diego Melendo Casado, San Francisco, CA (US); Pedro J. Moreno Mengibar, Jersey City, NJ (US); Fadi Biadsy, New York, NY (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/132,882

(22) Filed: Dec. 18, 2013

Related U.S. Application Data (60) Provisional application No. 61/914,554, filed on Dec. 11, 2013.

(51) Int. Cl.
*G10L 15/00* (2013.01)
*G10L 15/26* (2006.01)

(52) U.S. Cl.
CPC ........................... *G10L 15/265* (2013.01)
USPC ........... 704/235; 704/231; 704/251; 704/270; 704/270.1

(58) Field of Classification Search
CPC ....... G10L 15/00; G10L 15/18; G10L 15/183; G10L 15/26; G10L 2015/00; G10L 2015/06
USPC .................. 704/235, 231, 251, 270, 270.1
See application file for complete search history.

(56) References Cited

U.S. PATENT DOCUMENTS

| | | | |
|---|---|---|---|
| 5,513,298 A | 4/1996 | Stanford et al. | |
| 5,812,974 A | 9/1998 | Hemphill et al. | |
| 7,899,671 B2 * | 3/2011 | Cooper et al. | 704/252 |
| 8,332,218 B2 | 12/2012 | Cross, Jr. et al. | |
| 8,494,850 B2 | 7/2013 | Chelba et al. | |
| 8,566,087 B2 | 10/2013 | Cross, Jr. et al. | |
| 2009/0234647 A1 * | 9/2009 | Scholz et al. | 704/235 |
| 2012/0278076 A1 * | 11/2012 | Lloyd et al. | 704/240 |
| 2012/0296643 A1 * | 11/2012 | Kristjansson et al. | 704/226 |
| 2013/0080056 A1 * | 3/2013 | Homma et al. | 701/537 |
| 2013/0204622 A1 | 8/2013 | Lu et al. | |

FOREIGN PATENT DOCUMENTS

| | | |
|---|---|---|
| EP | 2575128 | 4/2013 |
| WO | 2012/177646 | 12/2012 |

* cited by examiner

*Primary Examiner* — Qi Han
(74) *Attorney, Agent, or Firm* — Fish & Richardson P.C.

(57) ABSTRACT

A computer-implemented method can include receiving, by a computer system, a request to transcribe spoken input from a user of a computing device, the request including information that (i) characterizes a spoken input, and (ii) context information associated with the user or the computing device. The method can determine, based on the information that characterizes the spoken input, multiple hypotheses that each represent a possible textual transcription of the spoken input. The method can select, based on the context information, one or more of the multiple hypotheses for the spoken input as one or more likely intended hypotheses for the spoken input, and can send the one or more likely intended hypotheses for the spoken input to the computing device. In conjunction with sending the one or more likely intended hypotheses for the spoken input to the computing device, the method can delete the context information.

20 Claims, 6 Drawing Sheets

CONTEXTUAL SPEECH RECOGNITION

CROSS-REFERENCE TO RELATED APPLICATIONS

This application claims the benefit of U.S. Provisional Application Ser. No. 61/914,554, filed on Dec. 11, 2013, the entire contents of which are hereby incorporated by reference.

TECHNICAL FIELD

This specification generally relates to speech recognition.

BACKGROUND

Speech recognition has become an increasingly popular mode of human-machine interaction. As the number and types of devices that users interact with on a daily basis has grown, speech recognition has become a convenient and efficient way of inputting information into a computing device. In some instances, transcription of a user's spoken input using speech recognition techniques can be preferable to typing input with a physical or virtual keyboard. Mobile devices such as smartphones sometimes provide a virtual keyboard through which input can be provided by tapping or swiping across letters presented on a touchscreen display of the device. However, virtual keyboards provided on small-screen displays can be difficult for some to use, and generally requires that the user have at least one free hand to provide the input. One useful alternative to the virtual keyboard for typing or otherwise inputting information is speech recognition. Through speech recognition techniques, a user can speak what he or she intends to have typed, and the device responds accordingly such as by presenting transcribed text that corresponds to the user's spoken input. One objective of speech recognition techniques is to accurately interpret a user's spoken input.

SUMMARY

This document generally describes techniques for transcribing speech using context information. In some examples, such techniques can be used to improve the accuracy of speech recognition so that the speech can be transcribed to most likely match the speech that a user has uttered or that the user likely intended.

In one implementation, a computer-implemented method can include receiving, by a computer system, a first request to transcribe spoken input from a user of a computing device. The first request can include (i) information that characterizes a first spoken input, and (ii) first context information associated with the user or the computing device. The method can determine, based on the information that characterizes the first spoken input, multiple hypotheses that each represent a possible textual transcription of the first spoken input. The method can select, based on the first context information, one or more of the multiple hypotheses for the first spoken input as one or more likely intended hypotheses for the first spoken input, and can send the one or more likely intended hypotheses for the first spoken input to the computing device. In conjunction with sending the one or more likely intended hypotheses for the first spoken input to the computing device, the method can delete, by the computer system, the first context information.

These and other implementations can optionally include one or more of the following features. The method can further include receiving, by the computer system at a later time, a second request to transcribe spoken input from the user of the computing device, the second request including (i) information that characterizes a second spoken input, and (ii) second context information associated with the user or the computing device. The method can determine, based on the information that characterizes the second spoken input, multiple hypotheses that each represent a possible textual transcription of the second spoken input. Based on the second context information and to the exclusion of the first context information, the method can select one or more of the multiple hypotheses for the second spoken input as one or more likely intended hypotheses for the second spoken input, and the method can include sending the one or more likely intended hypotheses for the second spoken input to the computing device. In conjunction with sending the one or more likely intended hypotheses for the second spoken input to computing device, the second context information can be deleted by the computer system.

The context of the computing device that defines both the first context information and the second context information may be unchanged between a time when the computing device submits the first request and a later time when the computing device submits the second request such that the first context information is equivalent to the second context information. The first context information can include a personal contacts list for the user that includes names of one or more persons associated with the user. The personal contacts list can be a list of contacts that the user has recently interacted with, a list of contacts that the user frequently interacts with, or a list of contacts that the user has designated as favorites. The first context information can include at least one of an application context, a current location of the computing device, recent user activity on the computing device, one or more recent searches performed by the user, and currently or recently displayed content by the computing device.

Determining the multiple hypotheses for the first spoken input can include determining respective scores for the multiple hypotheses. Selecting the one or more of the multiple hypotheses as the one or more likely intended hypotheses for the first spoken input can include using the context information to bias the respective scores for the multiple hypotheses based on whether particular ones of the multiple hypotheses include particular terms that correspond to terms in the first context information. Determining the multiple hypotheses for the first spoken input can include identifying, based on the first context information, at least one hypothesis for the first spoken input that would not have been identified without the first context information. The method can further include processing the first context information to make the first context information anonymous.

In one implementation, a computer-implemented method includes, receiving, by a server system, a first transcription request and a second transcription request, each of the first and second transcription requests including (i) respective information that characterizes respective spoken input from a user of a computing device, and (ii) respective context information associated with the user or the computing device. For each of the first and second transcription requests, the method can include determining, based on the respective information that characterizes the respective spoken input, a plurality of possible textual transcriptions for the respective spoken input, and selecting, based on the respective context information, one or more of the plurality of possible textual transcriptions as likely intended textual transcriptions for the respective spoken input. The method can include sending the likely intended textual transcriptions for the respective spoken input to the computing device, and in conjunction with sending the likely intended textual transcriptions for the respective spoken input to the computing device, deleting the respective context information by the remote server system.

These and other implementations can optionally include one or more of the following features. The respective context information for at least one of the first transcription request and the second transcription request can include a personal contacts list for the user that includes names of one or more persons associated with the user. The personal contacts list can be a list of contacts that the user has recently called or messaged, a list of contacts that the user frequently calls or messages, or a list of contacts that the user has designated as favorites. The respective context information can include at least one of an application context, a current location of the computing device, recent user activity on the computing device, one or more recent searches performed by the user, and currently or recently displayed content by the computing device.

Determining the plurality of possible textual transcriptions for the respective spoken input can include determining respective scores for each of the textual transcriptions, and selecting the one or more of the plurality of possible textual transcriptions as the one or more likely intended textual transcriptions for the spoken input can include using the respective context information to bias the respective scores for the plurality of possible textual transcriptions based on whether particular ones of the possible textual transcriptions include particular terms that correspond to terms in the respective context information.

The method can include identifying, based on the respective context information, at least one possible textual transcription for the respective spoken input that would not have been identified without using the context information. The method can further include processing the respective context information to make the context information anonymous.

In one implementation, a computer system can include one or more computing devices, an interface, a speech data repository, a speech recognition, and a context deletion module. The one or more computing devices can be programmed to receive a request to transcribe spoken input provided by a user of a client device that is remote from the computer system. The speech data repository can be accessible to the one or more computing devices and can include data that maps linguistic features in a language to one or more elements of speech in the language. The speech recognition engine can be installed on the one or more computing devices and programmed to determine, using context information associated with the user or the client device, one or more hypotheses that represent one or more likely intended textual transcriptions for the spoken input. The context information can be determined based on information in the request. The transmitter can be installed on the one or more computing devices and can be programmed to cause the one or more hypotheses to be sent to the client device in response to the request. The context deletion module can be installed on the one or more computing devices and programmed to delete the context information in conjunction with the transmitter sending the one or more hypotheses to the client device.

These and other implementations can optionally include one or more of the following features. The context information can include a personal contacts list for the user that includes names of one or more persons associated with the user. The personal contacts list can include a list of contacts that the user has recently interacted with, a list of contacts that the user frequently interacts with, or a list of contacts that the user has designated as favorites. The context information can include at least one of an application context, a current location of the client device, recent user activity on the client device, one or more recent searches performed by the user, and an indication of currently or recently displayed content by the client device.

Particular implementations of the subject matter described in this specification may realize one or more of the following advantages. Context information can be used to improve the accuracy of responses to transcription requests. Responses to transcription requests can use current information about a computing device that submitted the request, or about a user of the computing device, to select a likely intended transcription hypothesis. A user's privacy can be respected by deleting or otherwise discarding, in conjunction with responding to a transcription request, context information that was provided with the transcription request.

BRIEF DESCRIPTION OF THE DRAWINGS

Like reference numbers and designations in the various drawings indicate like elements.

DETAILED DESCRIPTION

Figure 1A:
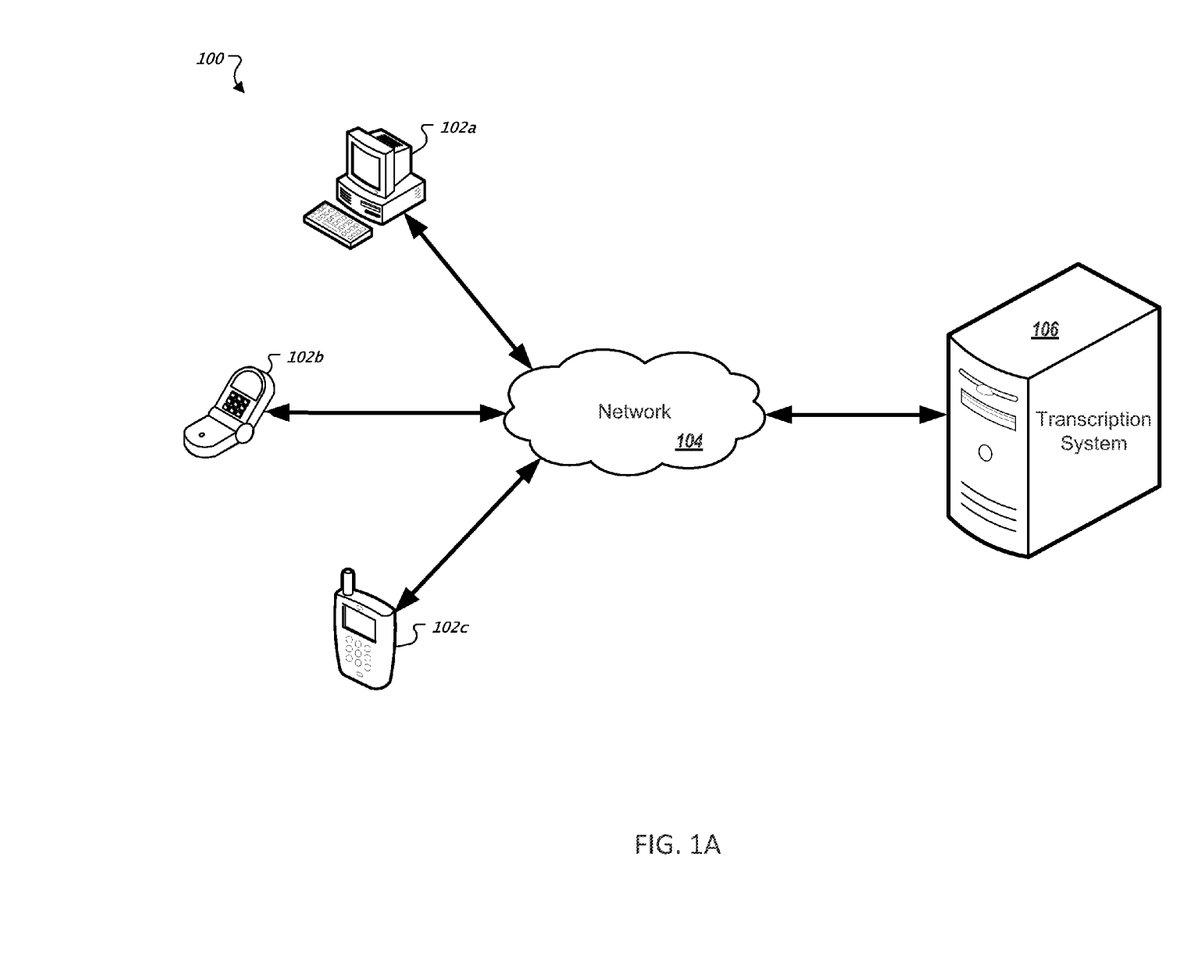
FIG. 1A is a schematic diagram of an example system for transcribing speech using context information in a manner that protects users' personal information.

FIG. 1A is a schematic diagram of an example system 100 that can be used for transcribing speech using context information in a manner that protects users' personal information. In general, a plurality of client computing devices 102a-c are shown communicating over a network 104 with transcription system 106. The client devices may be, for example, a smartphone, a tablet computing device, a notebook or desktop computing device, an integrated vehicle computer system, or any other suitable device capable of receiving spoken input and communicating over a network. Each device 102a-c may have an integrated microphone, external microphone, or other means for capturing spoken input from a user. Upon receiving spoken input, each of the devices 102a-c determines a context that may be relevant to the substance of the spoken input. The devices 102a-c each communicates the spoken input and the context over the network 104 to the transcription system 106. The transcription system 106 can then process the spoken input to determine one or more hypotheses that correspond to possible transcriptions for the spoken input, and can use the context information to select particular hypotheses that most likely match the user's intended input. The transcription system 106 transmits the selected hypotheses to the client devices 102a-c, and in conjunction with transmitting the selected hypotheses, or otherwise in conjunction with responding to and satisfying the transcription requests from a particular client device 102, the transcription system deletes the context information that it received as part of the request.

The context information is therefore not retained for further use by the transcription system 106 or any other entity associated with the transcription system 106.

Figure 1B:
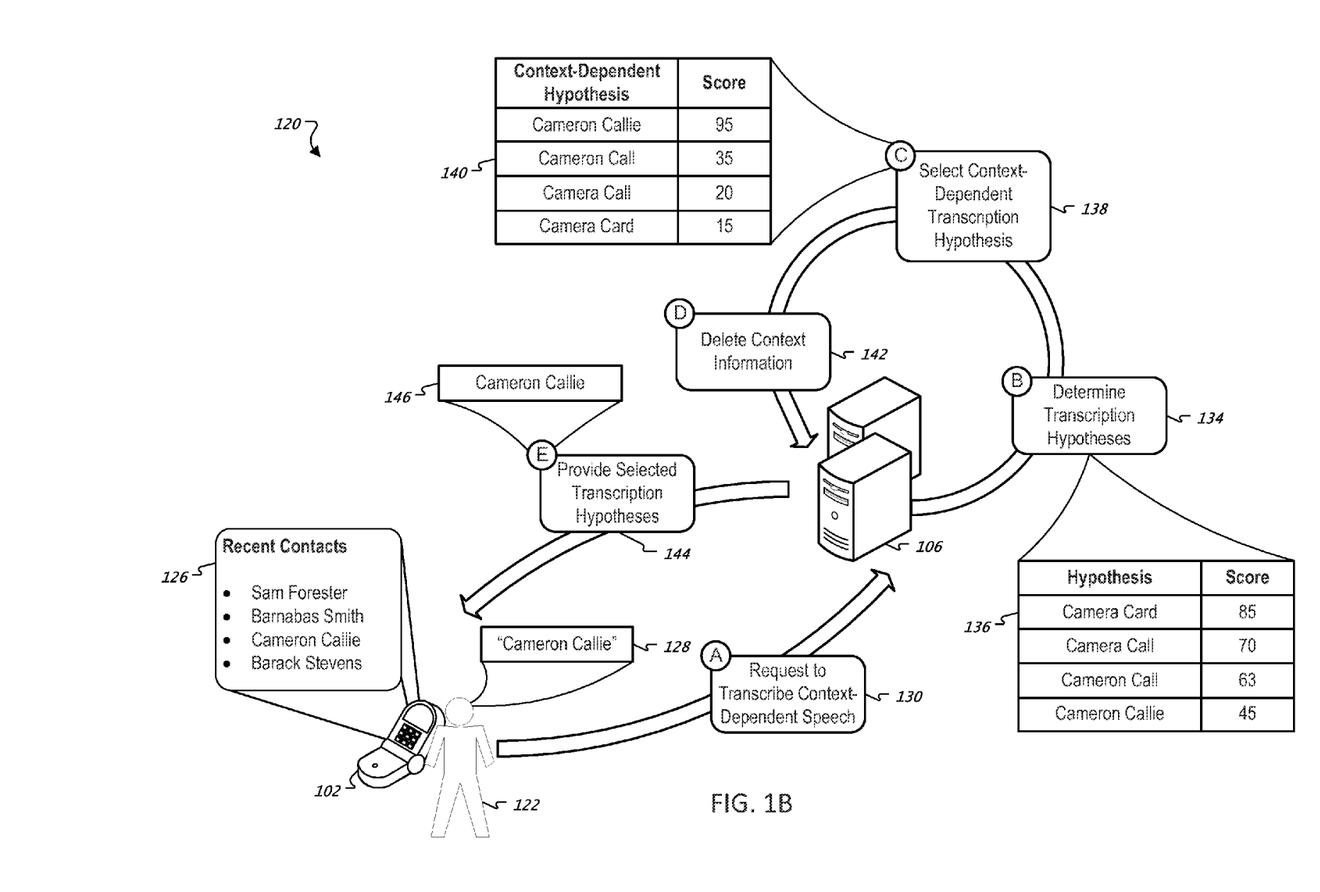
FIG. 1B is a schematic diagram of an example system for transcribing spoken input using context information associated with the spoken input.

FIG. 1B is a schematic diagram of an example system 120 for transcribing spoken input using context information. The system 120 includes a client device 102 and a transcription system 106. Although not shown, the client device 102 and the transcription system 106 may be remote from each other and communicate over a network such as the Internet. The client device 102 is shown in this example as a mobile computing device such as a smartphone. Other types of client devices 102 may also be employed such as a tablet computing device, a notebook computer, or a desktop computer, for example.

The client device 102 is capable of receiving spoken input and determining a context associated with the spoken input. Thus, a user 122 of the client device 102 is shown as speaking the name "Cameron Callie" at 128. Cameron Callie may be a friend or co-worker of the user 122, and is someone that the user 122 frequently calls from his or her device 102, for example. Accordingly, "Cameron Callie" is included in a list of recent contacts 126 maintained by the client device 102. In some examples, the list of recent contacts 126 may be stored by the client device 102, even if it not displayed by the device, for example, if the user simply accessed a phone application and uttered "Cameron Callie." The user could also select a display of the recent contacts list and then speak "Cameron Callie." In any case, the client device 102 may detect and record the spoken input, for example, by digitally sampling signals from a microphone or other audio transducer associated with the device.

At operation A (130), the client device 102 submits a request to the transcription system 106 to transcribe context-dependent speech. The request can include both data that represents the spoken input and a context associated with the spoken input. For example, in response to the user 122 speaking "Cameron Callie" as input to the client device 102, the device 102 determines that the user's recent contacts list is relevant context to the spoken input, and transmits a request to transcribe the user's 122 speech along with information from the user's recent contacts list. The transmitted contact list includes various names, including "Cameron Callie," the name that matches the speech that the user 122 intended to provide to the client device 102. The device 102 can determine that the recent contacts list is relevant context for submitting with the request in various manners. In some implementations, particular contexts may be associated with an application so that when a transcription request is sent from the application, the particular context associated with the application is automatically sent. For example, one or more of a recent contacts list, frequently called contacts list, favorite contacts lists, and an entire (unfiltered) contacts list can be configured to be sent with any transcription request from a phone application. The list may also include contacts that the user 122 has interacted with in other manners, such as contacts that the user has recently e-mailed, interacted with on a social network or on social media, texted, chatted, or otherwise messaged with using the device 102 or using another device associated with the user 122. In some examples, the context submitted in a request may also be selected based on the particular operation of the computing device or the application of the computing device from which the request originates. For instance, if the user 122 is on a call screen of the phone application, then the device 102 can determine that the user is likely providing the name of a contact in the spoken input, and therefore determine that a contacts list is relevant context to provide to the transcription server 106. On the other hand, if the user 122 is on settings page for the phone application, then the device 102 may determine that a preferred settings list, rather than a contacts list, is relevant context for the spoken input.

At operation B (134), upon receiving the request from the client device 102, the transcription system 106 determines one or more hypotheses for the spoken input. The hypotheses can represent possible transcriptions for the spoken input. Various techniques for determining the one or more hypotheses are described in further detail herein with respect to FIGS. 2-4. In certain implementations, the one or more hypotheses are initially determined without using the context information from the request. The one or more hypotheses may be assigned scores that reflect a confidence as to how likely each hypothesis likely matches the user's intended input. This initial scoring may reflect confidences without taking into account the request's context information. Thus, table 136 depicts four possible transcription hypotheses for the phrase "Cameron Callie." Because "Cameron Callie" is not a common name, and also includes individual terms whose usage frequency in a language is relatively low, and whose concurrence frequency (i.e., an indication of how often two or more terms are used together) in the language is also relatively low, the transcription server 106 initially scores the "Cameron Callie" hypothesis as being less relevant than three other hypotheses. The lower score indicates that, in the absence of accounting for context information, the transcription server 106 would determine that "Camera Card" is more likely an accurate interpretation of the spoken input than "Cameron Callie," contrary to what the user 122 actually spoke or intended to speak to the device 102.

In some implementations, the initial determination of transcription hypotheses at operation B (134) may use the context information to determine one or more of the hypotheses, even if the context information is not initially used to score the hypotheses. For example, some hypotheses, such as "Camera Card" and "Cameral Call" may be determined based only on the spoken input and without using the context information from the user's recent contacts list. However, because "Callie" or "Cameron Callie" may not be terms that the transcription server 136 would typically recognize, the transcription system 106 can, in some examples, compare the spoken input to terms that are included in the context information, and determine whether a similarity between the spoken input and such terms from the context information satisfies a threshold similarity. If the threshold similarity is satisfied, then the terms from the context information are added to the list 136 of one or more hypotheses. For example, "Cameron Callie" may be included in the one or more hypotheses as a result of determining that the spoken input is sufficiently similar to the name "Cameron Callie" from the user's 122 recent contacts list. However, the score for "Cameron Callie" in table 136 may not reflect any importance from the fact that "Cameron Callie" is provided in the recent contacts list at this stage of operations.

In some implementations, the transcription server 106 may automatically select one or more terms from the context information to return to the client device 102 in response to the request if a match between the spoken input and the one or more terms from the context information satisfies a predetermined threshold similarity score. In this way, the transcription server 106 can limit the scope of words or terms that the spoken input is compared against. For example, if the transcription server 106 first checks the spoken input against the recent contacts list and determines that "Cameron Callie," as used in the contacts list, is highly similar to the spoken input, then the transcription server 106 may return "Cameron Callie" to the client device 102 without checking the spoken input against other terms outside of the recent contacts list.

At operation C (138), the transcriptions server 106 selects one or more transcription hypotheses that are determined, based on a current context associated with the client computing device 102 or user of the client computing device 102, to likely correspond to the user's 122 intended input. The context information that was received as part of the request is used in making the selection. In one example, the context information can be used to bias the scores of the one or more hypotheses that were determined at operation B (134) so that the hypotheses are re-ranked based on the context. For instance, FIG. 1B shows that "Cameron Callie" is promoted from being a relatively low-confidence hypothesis in the initial scores 136 to being the highest-ranked, and highly confident, hypothesis in table 140 as a result of weighting the hypotheses using current context from the recent calls list. The high score for "Cameron Callie" may be further increased as a result of determining an exact match between an initial hypothesis and one of the names listed in the recent contacts context information. Similarly, "Cameron Call" has been promoted to second position in table 140 over the "Camera Call" and "Camera Card" hypotheses because at least one term exactly matches a name in the recent contacts list. However, because another hypothesis matches both the first and last names in the recent contacts list, while "Cameron Call" matches just one, its score is much lower than that of "Cameron Callie."

Additional techniques for selecting one or more likely intended hypotheses based on current context can also be used. In some implementations, the transcription server 106 can identify which, if any, of the initial hypotheses are associated with the context information and re-score only these identified hypotheses. In some implementations, the context information can be used to exclude certain hypotheses from consideration as candidates for responding to a transcription request. For example, the transcription server 106 can determine that neither "Camera Card" nor "Camera Call" include any terms that are included in the user's 122 recent contacts list, and therefore they are discarded as potential hypotheses. The context information may also be used to define a limited vocabulary from which the initial hypotheses are selected. In such examples, the transcription server may identify and score only terms that are associated with the context information. For example, each of the contacts "Sam Forester," "Barnabas Smith," "Cameron Callie," and "Barack Stevens" may be tested against the spoken input, and one or more of the contacts that score highest or that exceed a certain threshold score may be selected and returned to the client device 124.

In some implementations, the transcription server 106 can use additional indicators from the context information to select the one or more context-dependent hypotheses. For example, the recent contacts list for the user 122 may identify how frequently the user 122 has called each of the recent contacts, or whether any of the recent contacts is also a favorite contact or is connected to the user 122 on a social network. In this way, particular ones of the recent contacts that appear most closely connected to the user 122 may be weighted higher than other ones of the recent contacts that do not. For example, "Sam Forester" may be the most recently called contact by the user 122, but Sam may be a babysitter that the user 122 calls relatively infrequently to watch his or her children. On the other hand, "Cameron Callie" may be the user's 122 best friend and they may call each other frequently. The transcription server 106 can determine, based on these additional context indicators, that "Cameron Callie" is more relevant to the request than "Same Forester" and can therefore cause certain hypotheses that are similar to "Cameron Callie" to be weighted higher than hypotheses related to "Sam Forester." Similar techniques can apply in other applications as well. For example, if a user submits from a web browser a request to transcribe speech that identifies a website that the user would like to visit, the client device 102 may submit a list of the user's browsing history or bookmarked sites, for example. The list of sites may include indications of how recently or how frequently the user visits the sites, so that the most recent and/or frequent sites are weighted higher than other sites in the list.

At operation D (142), after the context information has been used to select one or more context dependent hypotheses, the transcription server 106 deletes the context information associated with the request. In some examples, the context information is deleted in order to protect the user's 122 privacy by ensuring that the context information cannot or will not be used for subsequent purposes beyond fulfilling the particular transcription request for which the context information was provided to the transcription server 106. The context information is generally deleted in conjunction with responding to the particular request so that the context information is no longer stored by or available to the transcription system 106 for any significant period of time after providing the one or more selected context-dependent hypotheses to the client device 102. In some implementations, the context information is deleted upon selecting the hypotheses at operation C (138). In some implementations, the context information is deleted immediately before or after sending the selected hypotheses to the client device 102. During the entire process of responding to a transcription request, the transcription server 106 may isolate the context information from other services. For example, the context information may not be shared or made accessible to other systems or modules for purposes other than responding to the request, or the transcription system 106 can ensure that the context information is deleted from any other systems or modules in conjunction with responding to the request. In some implementations, the context information can be stored by the transcription system 106 anonymously while processing a request so that the context information is not associated with the client device 102 or the user 122 in other manners.

At operation E (144), the transcription system 106 sends the one or more selected context-dependent hypotheses over the network and to the client device 102. Upon receiving the selected hypotheses, the client device 102 can take appropriate action. For example, because the user 122 provided the spoken input in a phone application, the device 102 can select "Cameron Callie" and automatically initiate a phone call to "Cameron Callie" using a known telephone number. The device 102 may also prompt the user to query whether the selected hypothesis is correct so that the user can confirm the transcription and whether to place a call to "Cameron Callie." In some examples, the transcription server 106 may return multiple hypotheses to the client device 102. The device 102 may then take action based on the highest-ranked result, or may present a list of the hypotheses to the user to enable the user to select one or more hypotheses from the list. In some implementations, client device 102 can also perform context-based re-ranking or other selection of hypotheses when multiple hypotheses are received from the transcription server 106. For example, the transcription system 106 may have responded to a request with multiple hypotheses based on a limited context analysis, but the client device can expand the analysis to choose a most highly relevant hypothesis by using additional context information, such as particularly sensitive information, that was not provided to the transcription system 106 with the request.

The user 122 can subsequently direct the client device 102 to send additional transcription requests to the transcription system 106. Each time the client device 102 submits a request, context information may be provided with the request. Context information submitted with other requests is generally not used by the transcription system 106 to process additional requests. The transcription system 106 is configured to use only the context information provided as part of a particular request to respond to that particular request, and then to delete the context information upon responding to the request. For example, shortly after the user 122 makes a call to "Cameron Callie" based on the selected hypothesis that was returned in response to an initial request, the user 122 may subsequently provide spoken input to call "Barnabas Smith." The device 102 can provide a new request to the transcription server 106 that includes both the spoken input for "Barnabas Smith" and context information in the form of the user's 122 recent contacts list. The recent contacts list is provided to the server 106 again with the subsequent request, even though the list may not have changed since the earlier request for "Cameron Callie."

Figure 2:
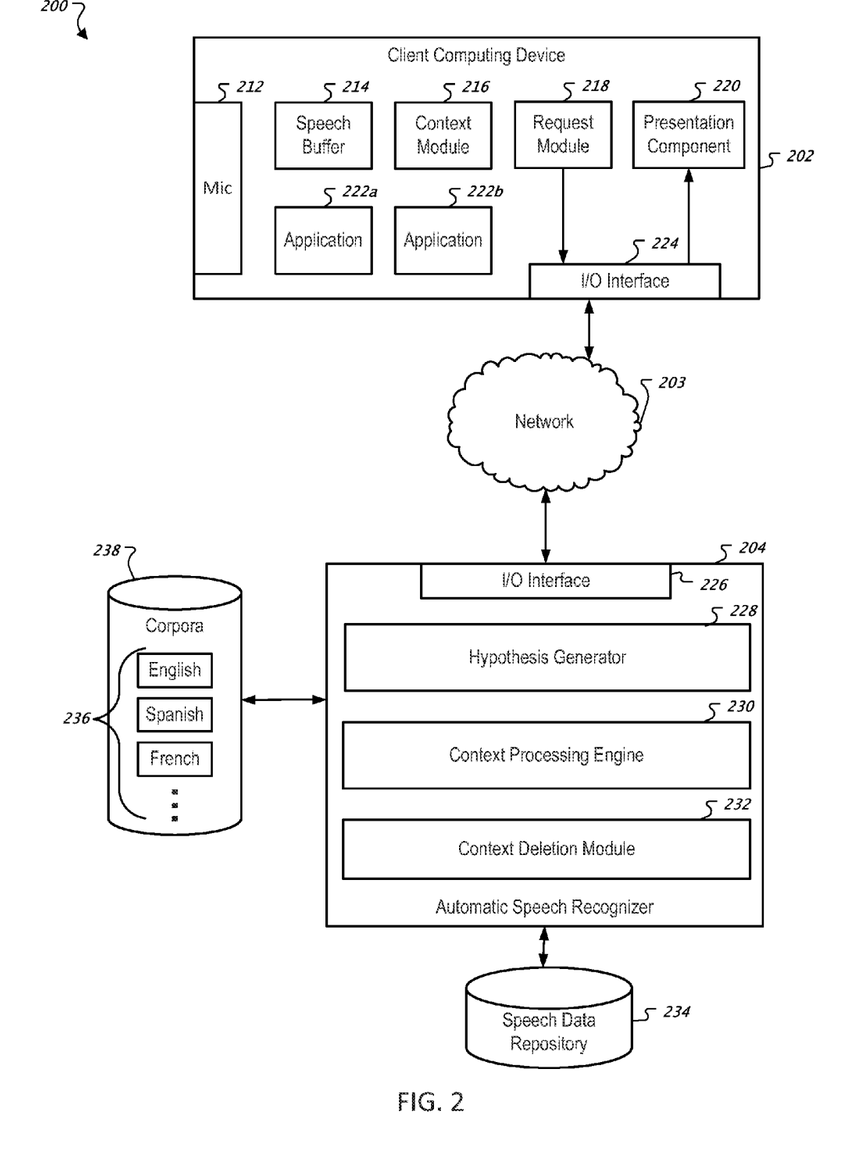
FIG. 2 is a schematic diagram of an example system for transcribing speech based on a context associated with the speech.

FIG. 2 is a schematic diagram of an example system 200 for transcribing speech based on a context associated with the speech. The system 200 can include a client computing device 202, network 203, an automatic speech recognizer 204, a language data repository 238, and a speech data repository 234. In some implementations, the system 200 can be configured to perform similar operations to those described in FIGS. 1A, 1B, and/or 3. For example, the transcription system 106 depicted in FIGS. 1A and 1B may include one or more of the automatic speech recognizer 204, the speech data repository 234, and the repository of language data 238.

Generally, the client computing device 202 is configured to receive spoken input from a user of the device 202, to determine context associated with the spoken input, and to transmit requests to the automatic speech recognizer 204 to transcribe spoken input using current context information. Some examples of the client computing device 202 include a smartphone, tablet computing device, desktop computer, notebook computer, or any other suitable device that can receive spoken input and communicate data over a network 203. The client device 202 can include a microphone 212, a speech buffer 214, context module 216, one or more applications 222a-b, request module 218, presentation component 220, and I/O interface 224.

The client device 212 is configured to receive spoken input. In some implementations, the input is received through a microphone 212 that is integrated in a body of the device 212, or that is otherwise connected to the device 212. When a user speaks, the device detects the speech as spoken input from the microphone 212, and stores information such as raw or compressed digital samples of the speech in speech buffer 214.

Context module 216 is programmed or otherwise configured to determine a context associated with spoken input. The determined context can be used to inform the automatic speech recognizer 204 about information that is likely relevant to the intended interpretation of the spoken input. The context information may be determined based on characteristics of the user who provided the spoken input, characteristics or other identifiers for the client computing device 202, application-specific characteristics about an application 222 in which the spoken input is received, and operation-specific characteristic such as particular tasks or function associated with a given application 222. Context can be determined from other factors as well, for example, based on recent activity of the user on the client computing device 222. Additional examples of determined context will be described in the following paragraphs.

In some implementations, the context module 216 determines context associated with the spoken input based on information about the user of the client device 202. For example, the device 202 may record particular terms or phrases that are strongly associated with the user. Such terms or phrases may be determined by analyzing previously typed or spoken input by the user at the client device 202. For instance, if the user frequently searches for information related to professional sports teams, the device 202 may include terms associated with the professional sports teams in a frequently-used terms list associated with the user. The list may also include terms that frequently appear in documents or other resources associated with the user that the user did not type or speak into the computing device. In one example, the list may include terms that frequently appear in a user's e-mail messages, stored documents, or that frequently appear in content that the user subscribes to and is interested in reading. Terms in the list can then be transmitted by the client device 202 to the automatic speech recognizer 204 so that the speech recognizer may bias its determination of transcription hypotheses in favor of such terms.

Context may also be determined based on a characteristic of the device at or near a time when the device 202 receives the spoken input. In one implementation, the context module 216 may determine a context based on content of a document or other resource that the user has recently accessed or that is displayed when the device 202 receives the spoken input. For example, as a user replies to an e-mail message, the context module 216 may determine context information that includes one or more terms from the content of the e-mail message. The context may also be determined based on a sender or recipients of the e-mail message. Similarly, if a user is browsing a web page, the context module 216 may determine some context associated with the web page that the user is browsing. For example, if the user submits a search query at a site that is related to cooking, then the context module 216 could prepare context information that informs the automatic speech recognizer 204 that the topic of the web page is cooking In some instances, the context module 216 may select terms that appear in the content to be provided to the automatic speech recognizer. In some examples, relevant context may be the web address of the page that the user is browsing or from which the user provided the spoken input, and the automatic speech recognizer 204 can then remotely perform additional analysis of the page or site that corresponds to the web address in order to determine relevant context information. By performing additional analysis at the automatic speech recognizer 204, the amount of on-device processing required to determine relevant context by client device 202 can be reduced.

The context module 216 can also determine context to associate with spoken input based on information about an application 222 that is associated with the spoken input. The application 222 may be an application that is installed on the client device 222 and from which the spoken input originated. A user may have also provided the spoken input within a particular operation associated with the application 222. Generally, the applications 222 may include third-party applications that are installed on the client device 202 (e.g., games, a preferred e-mail client or web browser, social networking applications), core applications that come pre-installed on the device 202 and that may be associated with an operating system on the client computing device 202 (e.g., phone or messaging applications, device contact managers, etc.), and web applications such as scripts or applets downloaded from a remote service. The application 222 may have associated metadata that identifies one or more terms that are strongly associated with the application 222, or that defines a particular application-specific lexicon or grammar. For example, if a user accesses an alarm clock application on the client device 202, and speaks "Set Alarm for 6:30 AM," then the context module 216 can determine information, such as the identity of the application, for communicating to the automatic speech recognizer 204. The context information may then be used to limit the corpus of possible terms that the speech recognizer 204 uses to identify transcription hypotheses, for example, to commands, numbers, and times used by the alarm clock application.

The context module 216 can also determine context for a spoken input from additional sources including a dialog history between the user and one or more other users, sensor information, a location of the client device 202, or an indication of the time at which the spoken input was received by the client device 202. Once the context module 216 has determined a relevant context associated with a spoken input, information about the spoken input from the speech buffer 214 and the determined context information is provided to the request module 218. The request module 218 formats a transcription request to send to the automatic speech recognizer 204 that includes the information about the spoken input and the context information. The request can then be transmitted by the I/O interface 224 over network 203 to the automatic speech recognizer 204. In some implementations, the context information and the spoken input are provided in a single request, or they may be provided separately in separate transmissions associated with a particular request.

The client device 202 can also provide an interface for the user to select one or more options regarding speech recognition. For instance, the user may select whether to enable contextual speech recognition. In some examples, the client device 202 may allow the user to opt-in to contextual speech recognition. When contextual speech recognition is disabled, the client device 202 does not send context information over the network 203 as part of speech transcription requests. In some implementations, the client device 202 may allow the user to select particular applications or operations from which context information is permitted to be transmitted with transcription requests, and which applications or operations from which context information is not to be transmitted. Similarly, a user may select particular types of context or otherwise select an extent of context information that is permitted to be used in association with a transcription request.

The automatic speech recognizer ("ASR") 204 is configured to generate one or more transcription hypotheses in response to a request from the client computing device 202. The ASR 204 includes a hypothesis generator 228, a context processing engine 230, and a context deletion module 232. The ASR 204 may also communicate with a language data repository 238 and a speech data repository 234. Requests are received and responses are transmitted through the I/O interface 226.

Upon receiving a transcription request, the ASR submits the request to hypothesis generator 228. The hypothesis generator 228 is configured determine one or more transcription hypotheses for the spoken input that is included in a request. The hypothesis generator may initially determine the transcription hypotheses with or without using the context information in the request. In one example, without using the context information, the hypothesis generator can identify particular linguistic features in the spoken input such as phonemes, words, or other small elements of an utterance by referencing information about the sounds of such elements in the speech data repository 234. Larger language constructs such as complete words, sequences of words, and phrases can be determined, for example, by referencing information about one or more languages in the language data repository 238. The language data repository 238 may include models of particular languages that indicate, for example, how frequently particular terms appear in each language and how terms are used together in a language to form phrases, sentences, and the like. For example, in a request to transcribe the name "Cameron Callie," the hypothesis generator 228 may identify "camera," "card," and "call" as three terms that may match the requested speech. The hypothesis generator may initially select the combination "camera card" over "camera call" as a more likely transcription hypothesis because the terms "camera card" are used in sequence more often in English than "camera call." Additional implementations for determining an initial hypothesis are described further with respect to FIG. 4, for example.

The context processing engine 230 uses context information in requests to select one or more hypotheses that are likely intended hypotheses for the spoken input. In some examples, the hypothesis generator 228 may have identified a set of possible hypotheses and assigned confidence scores to each of the possible hypotheses. The confidence scores assigned by the hypothesis generator 228 may have been determined using the spoken input but without using the context information from the request. Thus, the confidence scores for the set of possible hypotheses determined by the hypothesis generator 228 can represent a context-independent ranking of the possible hypotheses. The context processing engine can then adjust the confidence scores based on the context information in order to select one or more hypotheses that the user likely intended for the spoken input. For example, as described in FIG. 1B, the highest-ranked initial hypothesis for spoken input for "Cameron Callie" is "Camera Card." The context processing engine may then determine that "Cameron Callie" was more likely intended than "Camera Card" because "Cameron Callie" is included in the user's recent contacts list. In some implementations, the context processing engine can select or otherwise determine hypotheses that were likely intended in other manners as well. For instance, the context processing engine 230 could exclude certain hypotheses that are not included in or relevant to the request's context information.

The context deletion module 232 is configured to delete context information received in each request in conjunction with responding to the request. The context deletion module 232 can delete any substantive information associated with the context information immediately after using the context information to select one or more transcription hypotheses, or otherwise in conjunction with processing and responding to a request. For example, each of multiple requests transmitted, even in succession, from client computing device 202 to ASR 204 would need to include respective context information in each request because the ASR 204 is configured to only use the context information received with a particular request in generating hypotheses for the particular request. Once the ASR 204 responds to each request, the context information for the request is deleted by the context deletion module 232 so that the context information is no longer retained by the ASR 204. One advantage of such an arrangement is that personal, identifying, or other private information about a user is not retained by any systems remote from the client computing device and may not be used for purposes other than generating context-based transcription hypotheses in response to a particular request.

Figure 3:
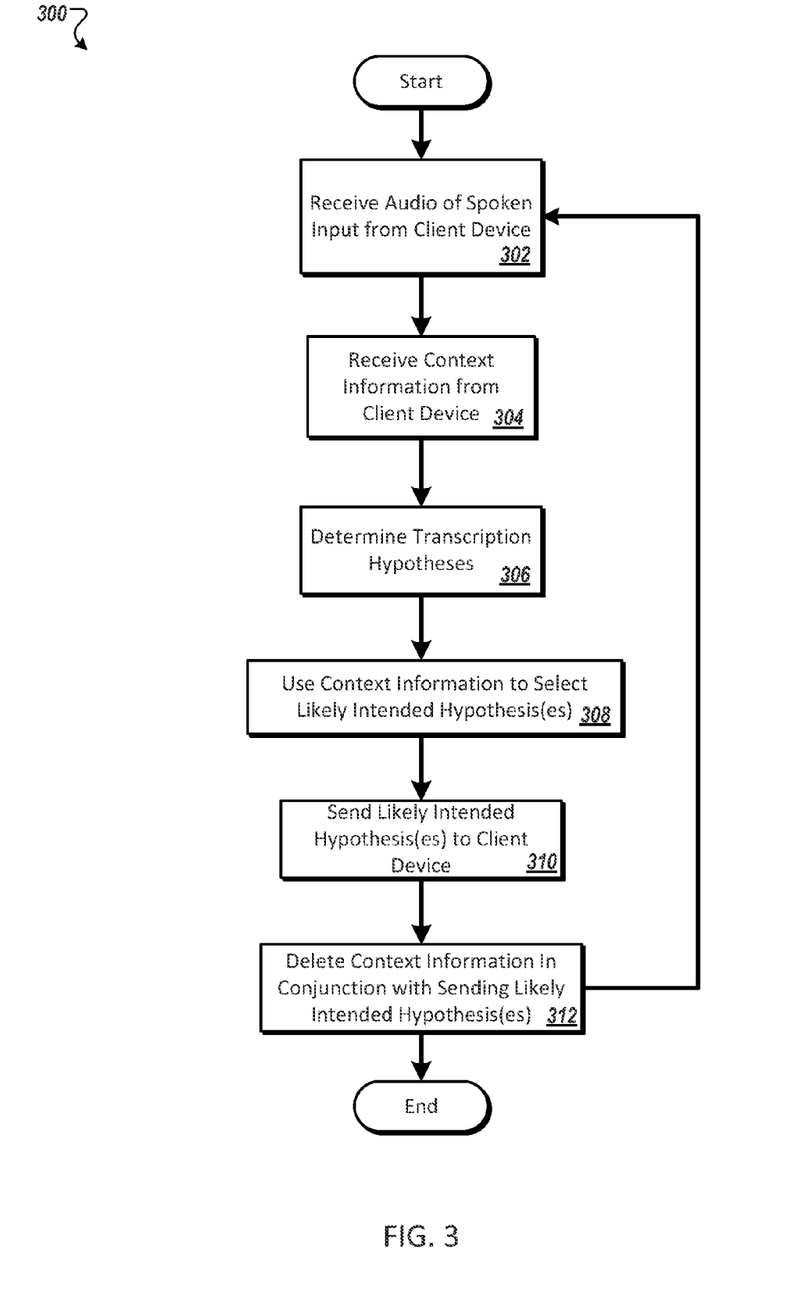
FIG. 3 is a flowchart of an example process for transcribing spoken input using context information.

FIG. 3 is a flowchart of an example process 300 for transcribing spoken input using context information. In some examples, the process 300 may be implemented by the systems shown in FIGS. 1A, 1B, and/or 2.

At operation 302, spoken input is received by a client computing device. For example, a user may use a microphone integrated in his or her smartphone or other personal computing device to record a phrase. The phrase may be provided, for example, in a dialog box of a user interface presented on a display of the device that captures textual input, such as a messaging application. Rather than typing the input, the user may prefer to speak the text that he or she wishes to have transcribed. In other examples, the spoken input may relate to commands that the user intends the device to carry out, such as "Call Work," or "Set Alarm to 3:00 AM."

At operation 304, a transcription system, such as transcription system 105 or automatic speech recognizer 204, receives context information as part of a request to transcribe spoken input from the client computing device. The context information may be formatted in various ways and may include information that relates to one or more different types of context. In one example, software for the transcription system may define an Application Programming Interface ("API") by which context information is communicated from the client computing device to the transcription system. The API can be used, for example, to pass context information from operating system functions on the client device, from functions in core applications that are associated with the operating system (e.g., a pre-installed phone application), or from functions in third-party applications that are installed at a user's discretion and that may be downloaded from an application marketplace. The API may define a standard protocol or data structure that the client device can use for sending one or more context terms to the transcription system. For example, the client device may extract names from a contact list and submit the names to the transcription system using the API or other standardized protocol. In this way, regardless of what the context information represents (e.g., contact names, web domains, media files, song lyrics, etc.) the transcription system can receive and interpret the information in an expected or otherwise standard manner. Existing APIs in an operating system, such as an accessibility API, may also be used for this purpose as an alternative to a dedicated API for sending contextual speech information.

In some implementations, the process 300 may include receiving context information other than terms that the client device has determined as being potentially relevant to a particular spoken input. In one example, an identifier for an application, operation, or network resource may be provided to the transcription system, which can then be processed by the transcription system to determine an appropriate context. This may be useful, for example, to leverage greater computing power at the transcription system than the client computing device by transferring computationally expensive context determination and formatting operations from the client device to the transcription system. For instance, if a user provides spoken input related to a web page that he or she is currently browsing, a uniform resource location ("URL"), uniform resource indicator ("URI"), or other address can be passed from the client device to the transcription system as the context information associated with the spoken input. The transcription system may then access the web page itself, or information about the web page that has previously been indexed, to identify particular terms that may be relevant to generating transcription hypotheses for the spoken input. In another example, the user may speak or sing portions of a song that he or she wishes to have transcribed. The client device may send identifiers for albums, songs, or artists in the user's media library as context information with the transcription request, which the transcription system may then process to identify, for example, lyrics or expanded information about the song that was not readily available from the client device. In one example, an identifier for an application or operation can be provided from the client computing device as the context for the request. For instance, an alarm clock application may pre-register with the transcription system so that the transcription system can associate a pre-defined grammar or limited vocabulary with the alarm clock application. Thus, when a user provides spoken input from the alarm clock application, the transcription system knows that the request is associated with the alarm clock application, and therefore will only respond with hypotheses that relate to alarm clock commands or clock times, for example.

Figure 4:
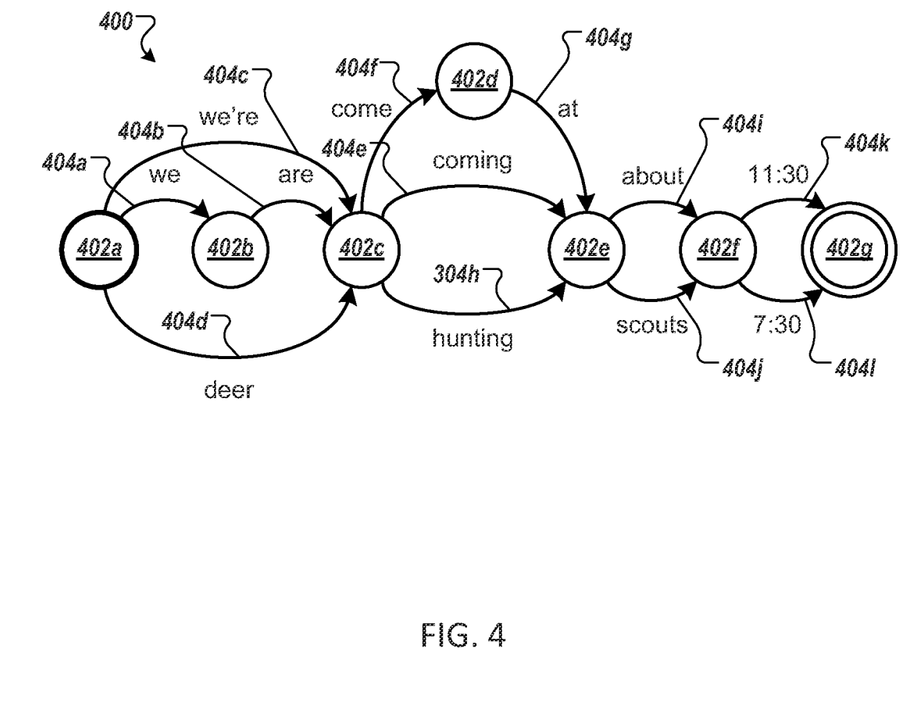
FIG. 4 is an example word lattice used for transcribing one or more words from spoken input.

At operation 306, the process 300 determines one or more initial transcription hypotheses for the spoken input. In some implementations, the initial transcription hypotheses can be determined without using the context information. One manner in which the initial hypotheses can be determined is by using a word lattice, as shown in FIG. 4. FIG. 4 depicts an example of a word lattice 400 used for transcribing one or more words or other terms from spoken input. The word lattice 400 is represented here as a finite state transducer. The word lattice 400 includes one or more nodes 402a-g that correspond to the possible boundaries between words. The word lattice 400 includes multiple edges 404a-1 for the possible words in the transcription hypotheses that result from the word lattice 400. In addition, each of the edges 404a-1 can have one or more weights or probabilities of that edge being the correct edge from the corresponding node. The weights are determined by the transcription system and can be based on, for example, a confidence in the match between the speech data and the word for that edge and how well the word fits grammatically and/or lexically with other words in the word lattice 400.

For example, initially, the most probable path through the word lattice 400 may include the edges 404c, 404e, 404i, and 404k, which have the text "we're coming about 11:30." A second best path may include the edges 404d, 404h, 404j, and 404l, which have the text "deer hunting scouts 7:30."

Each pair of nodes may have one or more paths corresponding to the alternate words in the various transcription hypotheses. For example, the initial most probable path between the node pair beginning at the node 402a and ending at the node 402c is the edge 404c "we're." This path has alternate paths that include the edges 404a-b "we are" and the edge 404d "deer." Accordingly, the edge 404e "coming" has alternate words that include the edges 404f-g "come at" and the edge 404h "hunting." The edge 404i "about" has an alternate word that includes the edge 404j "scouts" and the edge 404k "11:30" has an alternate word that includes the edge 404l "7:30." In this manner, the word lattice 400 can thus be used in determining one or more initial transcription hypotheses for spoken input. A score can be associated with each path the through word lattice 400 that represents a confidence of each transcription hypothesis.

With reference again to FIG. 3, at operation 308, the process uses context information received in the request from the client device to select one or more hypotheses that are likely intended hypotheses. For example, a transcription system can select one or more of the initial hypotheses that were determined at operation 306 that are determined to be a most accurate transcription or otherwise most likely intended hypothesis for the spoken input. In some examples, the likely intended hypotheses can be selected by using the context information to bias the weights between words in the word lattice 400. For instance, whereas the most likely path through the word lattice 400 in the set of initial hypotheses was "We're coming about 11:30," when the weights, and thus the resulting scores, of the hypotheses are adjusted based on the context information, the likely intended hypothesis can change significantly. For example, the context information may indicate that the user is interested in hunting, is currently browsing or has recently visited a hunting website, or has previously searched for hunting or outdoors gear. Accordingly, the alternate paths in the word lattice 400 that pertain to hunting are likely more relevant to the particular transcription request than they otherwise would be for requests from other users or at different times or in different contexts from the same user. Based on the context-adjusted weights in the word lattice 400, the process can select, for example, "Deer hunting about 11:30" as the likely intended hypothesis for the spoken input. In some implementations, the context information may also be used to identify other terms to include in the likely intended hypothesis that were not identified in the set of initial hypotheses.

The process continues with operation 310 in which the likely intended hypothesis is sent to the client device in response to the transcription request, and operation 312, in which the context information is deleted from the transcription system in conjunction with responding to the request. The context information can be deleted from the transcription system upon responding to a request to transcribe particular spoken input as a measure to ensure that the context information is not retained for any appreciable period of time in which it may be used for purposes other than responding to the request. Accordingly, each transcription request for which context will be used to select a likely intended hypothesis is accompanied by context information for the particular request. Context information from a first request is generally prevented from being used in responding to a second, different request.

Figure 5:
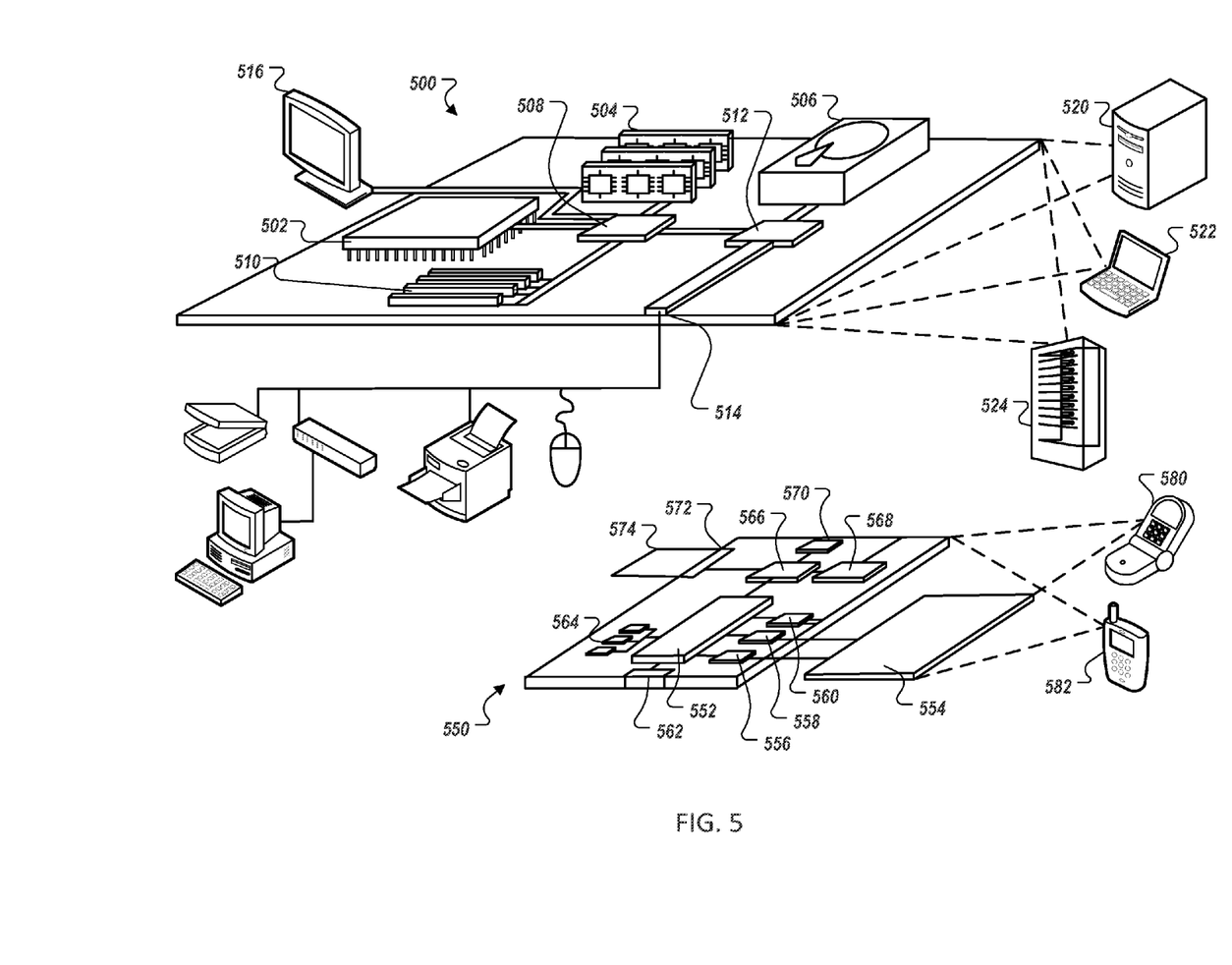
FIG. 5 shows an example of a computing device 500 and a mobile computing device that can be used to implement the techniques described herein.

FIG. 5 shows an example of a computing device 500 and a mobile computing device that can be used to implement the techniques described herein. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 604 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 650, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 650 through an expansion interface 572, which may include, for example, a SIMM (Single In Line Memory Module) card interface. The expansion memory 574 may provide extra storage space for the mobile computing device 550, or may also store applications or other information for the mobile computing device 650. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 660, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
   receiving, by a computer system, a first request to transcribe spoken input from a user of a computing device, the first request including (i) information that characterizes a first spoken input, and (ii) first context information associated with the user or the computing device;
   determining, based on the information that characterizes the first spoken input, multiple hypotheses that each represents a possible textual transcription of the first spoken input;
   selecting, based on the first context information, one or more of the multiple hypotheses for the first spoken input as one or more likely intended hypotheses for the first spoken input;
   sending the one or more likely intended hypotheses for the first spoken input to the computing device; and
   in conjunction with sending the one or more likely intended hypotheses for the first spoken input to the computing device, deleting, by the computer system, the first context information.

2. The computer-implemented method of claim 1, further comprising:
   receiving, by the computer system at a later time, a second request to transcribe spoken input from the user of the computing device, the second request including (i) information that characterizes a second spoken input, and (ii) second context information associated with the user or the computing device;
   determining, based on the information that characterizes the second spoken input, multiple hypotheses that each represent a possible textual transcription of the second spoken input;
   selecting, based on the second context information and to the exclusion of the first context information, one or more of the multiple hypotheses for the second spoken input as one or more likely intended hypotheses for the second spoken input;
   sending the one or more likely intended hypotheses for the second spoken input to the computing device; and
   in conjunction with sending the one or more likely intended hypotheses for the second spoken input to computing device, deleting, by the computer system, the second context information.

3. The computer-implemented method of claim 2, wherein a context of the computing device that defines both the first context information and the second context information is unchanged between a time when the computing device submits the first request and a later time when the computing device submits the second request such that the first context information is equivalent to the second context information.

4. The computer-implemented method of claim 1, wherein the first context information comprises a personal contacts list for the user that includes names of one or more persons associated with the user.

5. The computer-implemented method of claim 4, wherein the personal contacts list is a list of contacts that the user has recently interacted with, a list of contacts that the user frequently interacts with, or a list of contacts that the user has designated as favorites.

6. The computer-implemented method of claim 1, wherein the first context information includes at least one of an application context, a current location of the computing device, recent user activity on the computing device, one or more recent searches performed by the user, and currently or recently displayed content by the computing device.

7. The computer-implemented method of claim 1, wherein:
   determining the multiple hypotheses for the first spoken input includes determining respective scores for the multiple hypotheses, and
   selecting the one or more of the multiple hypotheses as the one or more likely intended hypotheses for the first spoken input includes using the context information to bias the respective scores for the multiple hypotheses based on whether particular ones of the multiple hypotheses include particular terms that correspond to terms in the first context information.

8. The computer-implemented method of claim 1, wherein determining the multiple hypotheses for the first spoken input includes identifying, based on the first context information, at least one hypothesis for the first spoken input that would not have been identified without the first context information.

9. The computer-implemented method of claim 1, further comprising processing the first context information to make the first context information anonymous.

10. A computer-implemented method comprising:
    receiving, by a server system, a first transcription request and a second transcription request, each of the first and second transcription requests including (i) respective information that characterizes respective spoken input from a user of a computing device, and (ii) respective context information associated with the user or the computing device;
    for each of the first and second transcription requests:
       determining, based on the respective information that characterizes the respective spoken input, a plurality of possible textual transcriptions for the respective spoken input;
       selecting, based on the respective context information, one or more of the plurality of possible textual transcriptions as one or more likely intended textual transcriptions for the respective spoken input;
       sending the one or more likely intended textual transcriptions for the respective spoken input to the computing device; and in conjunction with sending the one or more likely intended textual transcriptions for the respective spoken input to the computing device, deleting, by the server system, the respective context information.

11. The computer-implemented method of claim 10, wherein the respective context information for at least one of the first transcription request and the second transcription request comprises a personal contacts list for the user that includes names of one or more persons associated with the user.

12. The computer-implemented method of claim 11, wherein the personal contacts list is a list of contacts that the user has recently called or messaged, a list of contacts that the user frequently calls or messages, or a list of contacts that the user has designated as favorites.

13. The computer-implemented method of claim 10, wherein the respective context information includes at least one of an application context, a current location of the computing device, recent user activity on the computing device, one or more recent searches performed by the user, and currently or recently displayed content by the computing device.

14. The computer-implemented method of claim 10, wherein:
determining the plurality of possible textual transcriptions for the respective spoken input includes determining respective scores for each of the textual transcriptions, and
selecting the one or more of the plurality of possible textual transcriptions as the one or more likely intended textual transcriptions for the spoken input includes using the respective context information to bias the respective scores for the plurality of possible textual transcriptions based on whether particular ones of the possible textual transcriptions include particular terms that correspond to terms in the respective context information.

15. The computer-implemented method of claim 10, wherein determining the plurality of possible textual transcriptions for the respective spoken input includes identifying, based on the respective context information, at least one possible textual transcription for the respective spoken input that would not have been identified without the respective context information.

16. The computer-implemented method of claim 10, further comprising, for each of the first and second transcription requests, processing the respective context information to make the context information anonymous.

17. A computer system comprising:
one or more computing devices;
an interface of the one or more computing devices that is programmed to receive a request to transcribe spoken input provided by a user of a client device that is remote from the computer system;
a speech data repository that is accessible to the one or more computing devices and that includes data that maps linguistic features in a language to one or more elements of speech in the language;
a speech recognition engine that is installed on the one or more computing devices and that is programmed to determine, using context information associated with the user or the client device, one or more hypotheses that represent one or more likely intended textual transcriptions for the spoken input, wherein the context information is determined based on information in the request;
a transmitter that is installed on the one or more computing devices and that is programmed to cause the one or more hypotheses to be sent to the client device in response to the request; and
a context deletion module that is installed on the one or more computing devices and that is programmed to delete the context information in conjunction with the transmitter sending the one or more hypotheses to the client device.

18. The system of claim 17, wherein the context information comprises a personal contacts list for the user that includes names of one or more persons associated with the user.

19. The system of claim 18, wherein the personal contacts list is a list of contacts that the user has recently interacted with, a list of contacts that the user frequently interacts with, or a list of contacts that the user has designated as favorites.

20. The system of claim 17, wherein the context information includes at least one of an application context, a current location of the client device, recent user activity on the client device, one or more recent searches performed by the user, and currently or recently displayed content by the client device.

* * * * *